E. W. BURGESS.
GRAIN DRILL.
APPLICATION FILED AUG. 19, 1916.

1,264,153.

Patented Apr. 30, 1918.
2 SHEETS—SHEET 1.

Inventor.
Edward W. Burgess,
By Chas. E. Lord
Atty

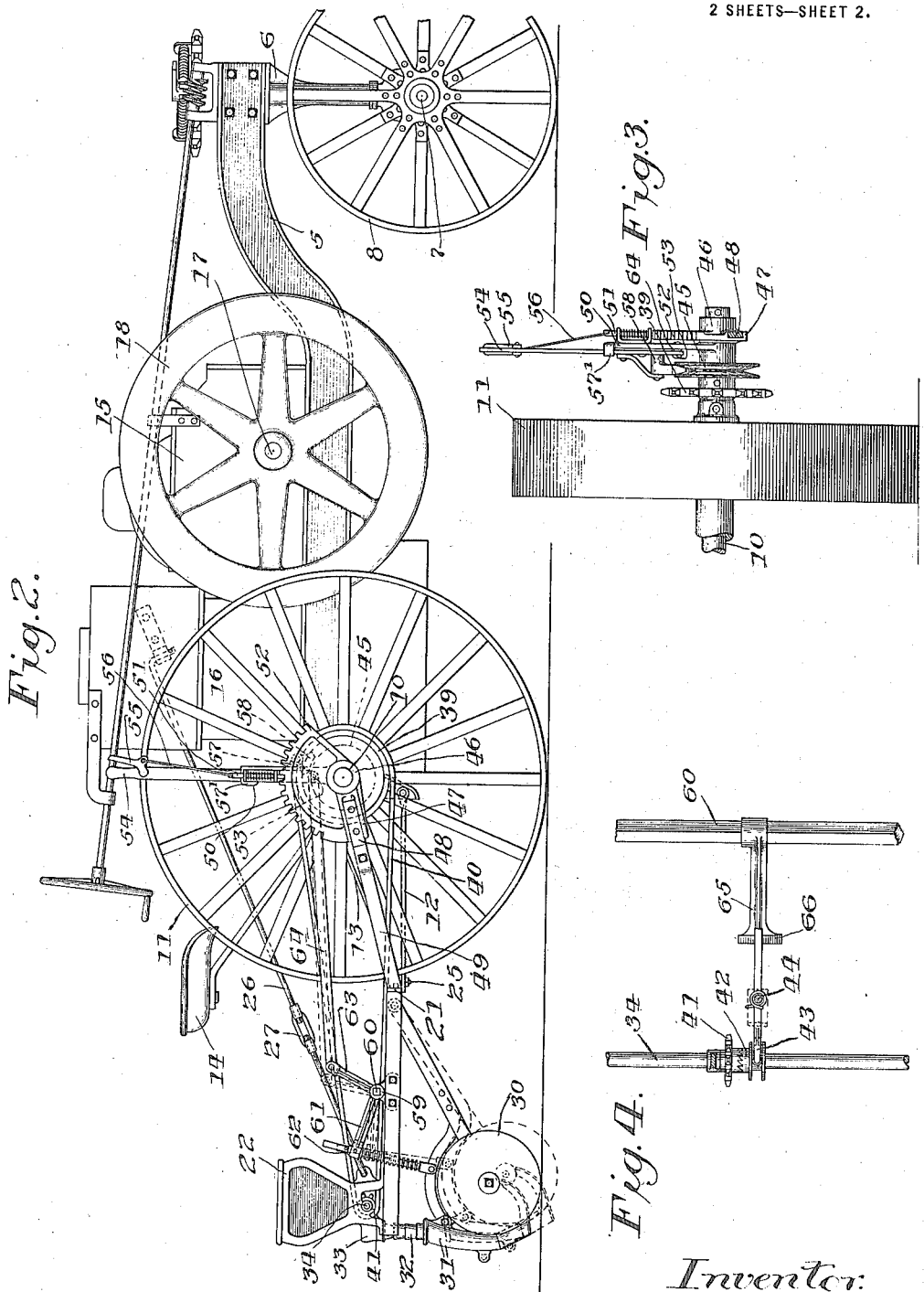

UNITED STATES PATENT OFFICE.

EDWARD W. BURGESS, OF CHICAGO, ILLINOIS, ASSIGNOR TO INTERNATIONAL HARVESTER COMPANY OF NEW JERSEY, A CORPORATION OF NEW JERSEY.

GRAIN-DRILL.

1,264,153.      Specification of Letters Patent.      Patented Apr. 30, 1918.

Application filed August 19, 1916. Serial No. 115,853.

*To all whom it may concern:*

Be it known that I, EDWARD W. BURGESS, a citizen of the United States, residing at Chicago, in the county of Cook and State of Illinois, have invented certain new and useful Improvements in Grain-Drills, of which the following is a full, clear, and exact specification.

My invention relates to grain drills, and in particular to a machine of the class indicated adapted to be connected with a tractor and have its operative parts connected with the power transmission gearing of the tractor in a manner to be driven thereby, and means whereby its furrow openers may be raised from the ground by a power lift mechanism operatively connected with a moving part of the tractor.

The object of the invention is to provide a machine that will be lighter, cheaper, more convenient and easier to operate, and more strongly constructed.

I attain this object by means of the mechanism illustrated in the accompanying drawings, in which—

Fig. 2 is a side elevation of Fig. 1;

Fig. 3 is a front elevation of detached parts of Fig. 1, designed to illustrate the construction of parts of the furrow opener controlling mechanism; and Fig. 4 is a plan view of a detached detail of Fig. 1, illustrating the operation and construction of a clutch mechanism forming a part of the structure.

The same reference characters designate like parts throughout the several views.

Figure 1:
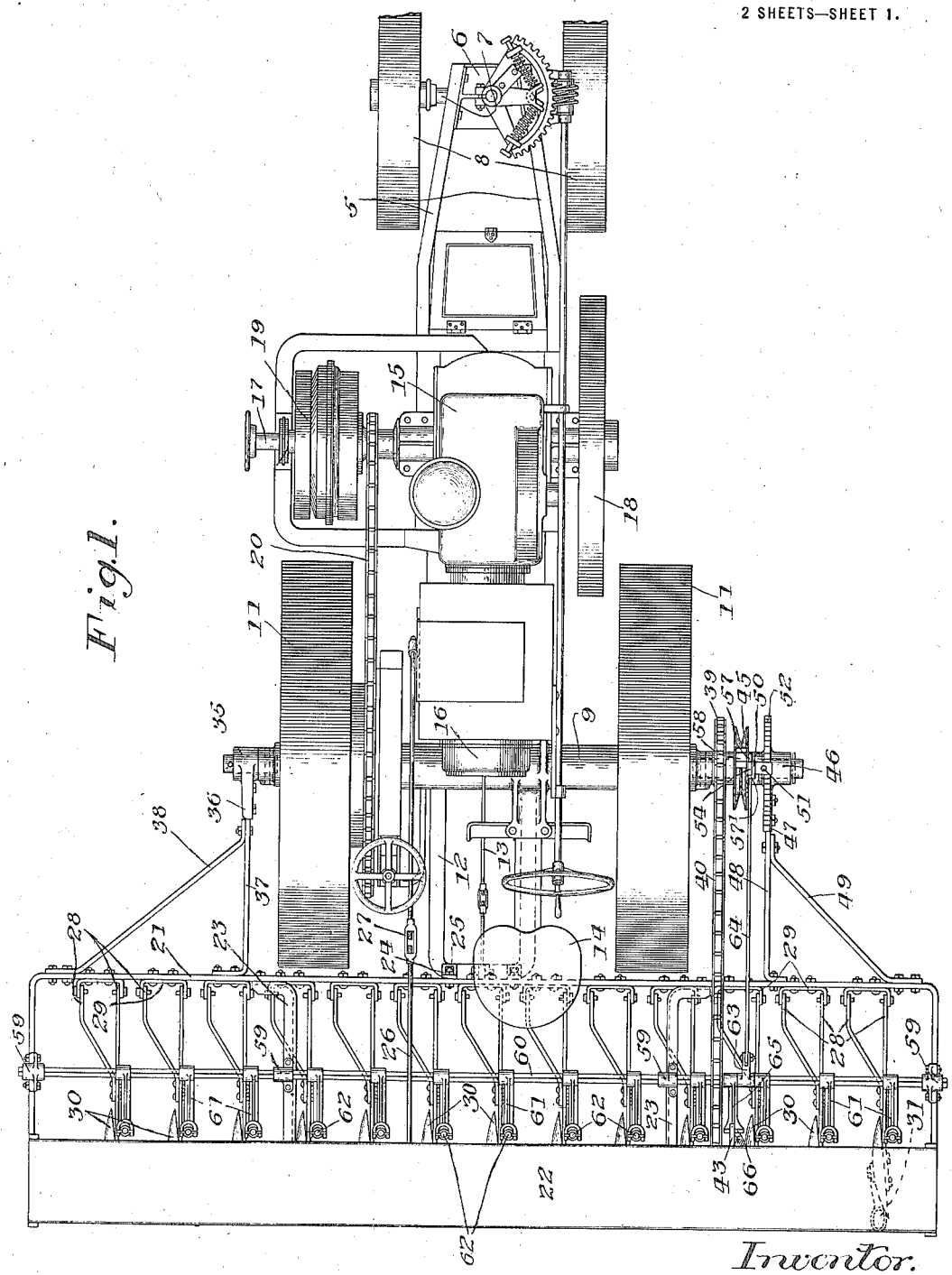
Figure 1 is a top plan view of a tractor having a grain drill connected therewith and embodying my invention.

The tractor includes longitudinally disposed truck frame members 5, having their front ends secured to a bolster member 6, with which is connected a steering axle 7 having steering wheels 8 mounted upon its opposite ends, 9 a transversely disposed tubular frame member secured to the rear ends of the truck frame members, in which is journaled an axle 10 having traction wheels 11 mounted upon its opposite ends, 12 a draft frame connected with the tubular frame member and supported by means of a longitudinally adjustable link 13, 14 an operator's seat, 15 an engine mounted upon the truck frame including a power cylinder 16, an engine shaft 17, a fly wheel 18, and a power transmission gearing 19 operatively connected with the axle by means including a sprocket chain 20.

The grain drill includes a U-shaped frame member 21 having a seed hopper 22 mounted upon its rearwardly extending arms, and 23 represents supplemental arms intermediate its ends. The frame member 21 is secured to the draft frame 12 of the tractor by means of clip members 24 and bolts 25, and 26 represents a supporting link adjustable longitudinally by means of a common form of turn buckle 27, the link having its rear end connected with the frame of the machine and its upper end detachably connected with a fixed part of the tractor. 28 represents a series of draw bars of a common form having their front ends pivotally connected with draft brackets 29 secured to the frame member 21. Journaled upon the the rear ends of the drag bars are furrow openers 30, and carried by the rear ends of the drag bars are seed conduits 31 receiving the lower ends of conductor tubes 32 having their upper ends connected with the delivery ends of seed cups 33 carried by the seed hopper 22.

The seed distributing mechanism includes a rotatable feed shaft 34. The axle 10 of the tractor is extended at its opposite ends, and at the left of the machine the extension is received by a sleeve 35 integral with a draft member 36 secured to the front end of a draft bar 37 having its rear end secured to the frame member 21, and 38 represents a diagonally disposed brace member connecting the draft bar with the end of the frame member 21. Secured to the axle extension, upon the opposite side of the machine, is a sprocket wheel 39 that is operatively connected by means of a sprocket chain 40 with a second sprocket wheel 41 mounted upon the feed shaft 34 and adapted to be connected therewith by means of a slidable clutch sleeve 42 splined upon the feed shaft and controlled by means of a clutch shipping fork 43 pivoted at 44 upon a fixed part of the machine. Rotatable with the sprocket wheel 39 is a friction sheave 45. The outer end of the axle extension is journaled in a sleeve 46 integral with a draft member 47 secured to the front end of a draft bar 48 having its rear end secured to the frame member 21 and supported laterally by means of a brace member 49 connecting its front end with the end of the frame member 21. Turnable about the axis of the sleeve 46, adjacent the friction sheave 45, is an arm 50 carrying a spring-pressed slidable detent 51 normally engaging a toothed sector 52 integral with the draft member 47. Pivoted upon the arm 50 at 53 is the lower end of a hand lever 54 carrying at its upper end a thumb lever 55 that is connected by means of a rod 56 with the detent 51. The lower end of the hand lever is provided with a forwardly extending arm 57, upon which is pivotally mounted a brake shoe 58 adapted to engage with the friction sheave 45. The hand lever may be turned forward and cause the shoe 58 to engage with the sheave, and when turned rearward it engages a lip 57¹ on the arm 50, thereby moving the arm with the lever. Journaled in bearing boxes 59 carried by the arms of the frame member 21 and the supplemental arms 23 is a rock shaft 60, and secured thereto is a series of pressure arms 61 corresponding in number with the drag bars and having their rear ends connected therewith by means of a common form of link and spring pressure mechanism 62. 63 represents a vertically disposed arm secured to the rock shaft 60 and connected by means of a bar 64 with the arm 50. 65 represents a rearwardly extending arm secured to the rock shaft 60 and provided at its rear end with a wiper arm 66 adapted to engage with the front end of the clutch shipping fork 43 in a manner to disengage the clutch sleeve 42 from the sprocket wheel 41 when the shaft 60 is carried in a direction to raise the furrow openers from the ground.

In operation the frame and seed hopper are carried by the tractor and may be adjusted in varying planes by means of the links 13 and 26; the feed shaft is driven by means of its operative connections with the tractor propelling mechanism; the operative plane of the furrow opening disks relative to the ground line is controlled by the hand lever 54. When the lever is pulled toward the operator it carries the arm 50 with it, thereby pressing the furrow openers to a lower plane, and the detent mechanism will secure the arm in its adjusted position. When the lever is moved forward the brake shoe 58 engages with the sheave 45, thereby turning the arm 50 forward with the shoe and lifting the furrow openers from the ground.

Having shown and described one embodiment of my invention, I do not desire that it be limited to the specific details of the structure as illustrated, it being understood that changes may be made in the form, proportion and organization of its various parts without departing from the spirit of my invention as indicated in the appended claims.

What I claim as my invention and desire to secure by Letters Patent is:

1. In combination, a tractor including a truck frame, traction wheels and a source of power, a planter including a frame having furrow openers carried by said tractor frame, supporting means connecting said planter frame with said tractor, said supporting means being adjustable whereby said planter frame may be carried in varying planes, and means operatively connected to said source of power for raising and lowering said furrow openers.

2. In combination, a tractor including a truck frame, an axle, traction wheels and a source of power, a planter carried by said tractor and including a frame having pivoted furrow opener frames, draft bars connecting said planter with the opposite ends of said tractor axle, and means operatively connected with said source of power for raising and lowering said furrow opener frames.

3. In combination, a tractor including a source of power, a planter including furrow openers and grain feeding mechanism, means for connecting said tractor and said planter, and means operatively connected to said source of power for raising said furrow openers and rendering said grain feeding mechanism inoperative.

4. In combination, a tractor including a source of power, a planter including a frame and pivoted drag bars carried thereby, and means operatively connected to said source of power for swinging said drag bars on their pivots.

5. In combination, a tractor including a source of power, a planter including a frame having spring-pressed drag bars pivoted thereto, grain feeding mechanism carried by said frame, and means operatively connected to said source of power for simultaneously swinging said drag bars about their pivots on said frame and rendering said grain feeding mechanism inoperative.

6. In combination, a tractor including a source of power, a planter including a frame, grain feeding mechanism carried by said frame, drag bars carried by said frame, and means operatively connected to said source of power for moving said drag bars about their pivots and rendering said grain feeding mechanism inoperative.

7. In combination, a tractor including a source of power, a planter including a frame, drag bars pivoted on said frame, grain feeding mechanism carried by said frame, a rock shaft journaled upon said frame, means carried by said rock shaft for controlling the operation of said grain feeding mechanism, means carried by said rock shaft for controlling a swinging movement of said drag bars about their pivots, and means operatively connected to said source of power for rotating said rock shaft.

8. In combination, a tractor including a truck frame, an axle, traction wheels and a draft frame, a planter including a frame and a seed hopper carried by said tractor, draft bars connecting said planter frame with opposite ends of said axle, rising and falling drag bars pivotally connected with said planter, a rock shaft journaled upon said frame, a series of pressure arms secured to said rock shaft, operative connections between said pressure arms and said drag bars, a friction sheave rotatable with said traction wheels, an arm turnable about the axis of said sheave, means controlled by an operator for connecting said arm with said sheave, a vertically disposed arm secured to said rock shaft, and a link connection between said sheave operable arm and said vertically disposed arm.

9. In combination, a tractor including a truck frame, an axle, traction wheels and a draft frame, a planter including a frame and a seed hopper carried by said tractor, draft bars connecting said planter frame with opposite ends of said axle, rising and falling drag bars pivotally connected with said grain drill frame, a rock shaft journaled upon said frame, a series of pressure arms secured to said rock shaft, operative connections between said pressure arms and said drag bars, a friction sheave rotatable with said traction wheels, an arm turnable about the axis of said sheave, a hand lever pivotally mounted upon said arm, a brake shoe carried by said lever and adapted to engage with said sheave, a vertically disposed arm secured to said rock shaft, and a link connection between said sheave operable arm and said vertically disposed arm.

10. In combination, a tractor including a truck frame, an axle, traction wheels and a draft frame, a planter including a frame and a seed hopper carried by said tractor, draft bars connecting said planter frame with opposite ends of said axle, rising and falling drag bars pivotally connected with said planter frame, a rock shaft journaled upon said frame, a series of pressure arms secured to said rock shaft, operative connections between said pressure arms and said drag bars, a friction sheave rotatable with said traction wheels, an arm turnable about the axis of said sheave, a detent carried by said arm, a relatively fixed toothed sector adapted to coöperate with said detent, a hand lever pivotally mounted upon said arm, detent controlling means carried by said lever, a brake shoe carried by said lever and adapted to engage with said sheave, a vertically disposed arm secured to said rock shaft, and a link connection between said sheave operable arm and said vertically disposed arm.

In testimony whereof I affix my signature.

EDWARD W. BURGESS.